C. E. REDDIG.
FLEXIBLE SHAFT COUPLING.
APPLICATION FILED SEPT. 10, 1920.
1,387,177.
Patented Aug. 9, 1921.
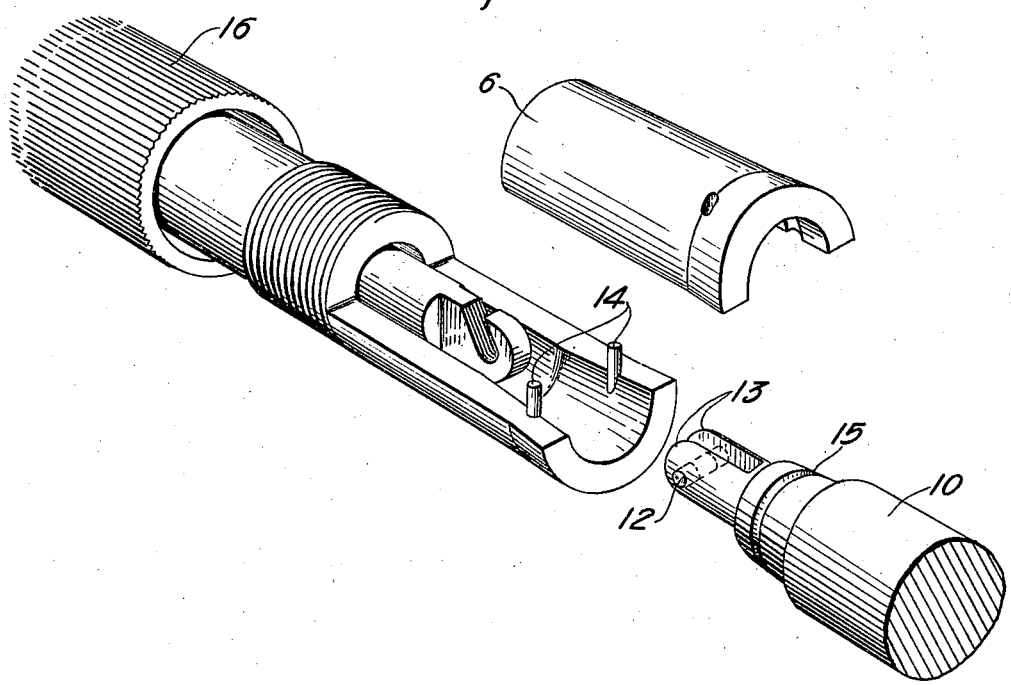
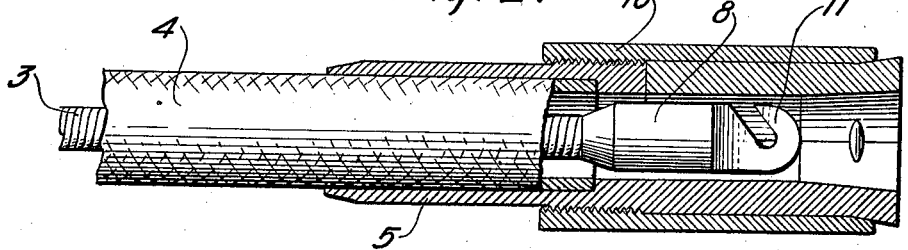
Inventor:
Charles E. Reddig.
by Howard M. Evans
Att'y.

UNITED STATES PATENT OFFICE.

CHARLES E. REDDIG, OF KEW GARDEN, NEW YORK, ASSIGNOR TO WESTERN ELECTRIC COMPANY, INCORPORATED, OF NEW YORK, N. Y., A CORPORATION OF NEW YORK.

FLEXIBLE SHAFT-COUPLING.

1,387,177. Specification of Letters Patent. Patented Aug. 9, 1921.

Application filed September 10, 1920. Serial No. 409,375.

*To all whom it may concern:*

Be it known that I, CHARLES E. REDDIG, a citizen of the United States, residing at Kew Garden, in the county of Queens, State of New York, have invented certain new and useful Improvements in Fexible Shaft-Couplings, of which the following is a full, clear, concise, and exact description.

This invention relates to shaft couplings. It is particularly, though not exclusively, useful in connection with flexible shafts.

An object of the invention is to provide a new and improved form of shaft coupling which is simple and rugged in construction, cheap to manufacture, and convenient from the standpoint of operation.

The invention will be understood from the following description taken in connection with the accompanying drawing in which Figure 1 shows the parts in perspective; and Fig. 2 shows the assembled parts in section, with one member of the coupling removed.

Referring to the drawing, the coupling is shown as mounted on the end of a flexible driving shaft 3 rotatable within a flexible casing 4. Secured to the end of the casing 4 is a sleeve 5 having a removable portion 6 of the form shown. Secured to the end of the flexible shaft 3 is a driving member 8 which lies within and is surrounded by the sleeve. Said driving member 8 at its free end is so formed that it is adapted for removable driving engagement with a driven member 10 which may be a tool, tool-holder, or a shaft to be driven. As shown, the end of the driving member 8 is in the form of a hook 11 which coöperates with a pin 12 mounted in the bifurcated end 13 of the driven member 10, but it is obvious that this driving connection may take many forms. The sleeve portions 5 and 6 and the driven member 10 are held in proper relation when the parts are assembled, in any suitable manner, for example, by means of dowel pins 14 which are mounted in the sleeve portion 5, extend into holes in the removable sleeve portion 6, and enter a groove 15 in the driven member 10, thereby restraining the latter from axial movement. In order to retain the removable sleeve portion 6 in place, a removable shell 16, preferably having a knurled outer surface, is provided. The inside of one end of the shell 16 has threads which coöperate with threads on the outside of the sleeve portion 5, in the manner shown in the drawing; and the other end of said shell 16 is preferably beveled on the inside as shown, so as to exert a wedging action on the slightly enlarged outer ends of the sleeve portions 5 and 6.

It will be obvious that the various parts, shown in disassembled condition in Fig. 1, can readily be assembled by inserting pin 12 in the hook 11, putting on the removable sleeve portion 6, and screwing the shell 16 to the position shown in Fig. 2.

What is claimed is:

1. A shaft coupling comprising a rotatable driving member, a sleeve surrounding said driving member and having a removable portion, a driven member adapted for removable driving engagement with said driving member within said sleeve, means adapted to coöperate with both portions of the sleeve and with the driven member whereby these parts are held in proper relation, and a shell removably surrounding both portions of said sleeve.

2. A shaft coupling comprising a rotatable driving member, a sleeve surrounding said driving member and having a removable portion, a driven member adapted for removable driving engagement with said driving member within said sleeve, there being a groove in said driven member, dowel pins adapted to coöperate with both portions of the sleeve and with the groove in the driven member, and a shell removably surrounding both portions of said sleeve and adapted to retain in place the removable portion of said sleeve.

In witness whereof, I hereunto subscribe my name this 8th day of September, A. D., 1920.

CHARLES E. REDDIG.